US009615151B2

(12) United States Patent
Hotchkiss et al.

(10) Patent No.: US 9,615,151 B2
(45) Date of Patent: Apr. 4, 2017

(54) VIRTUALIZED OPTICAL TRANSPORT NETWORK SYSTEMS AND METHODS

(71) Applicants: Adam R. Hotchkiss, Richardson, TX (US); Siraj Nour El-Ahmadi, Dallas, TX (US); Salam El Ahmadi, Dallas, TX (US); Gabriel E. Cardona, Richardson, TX (US)

(72) Inventors: Adam R. Hotchkiss, Richardson, TX (US); Siraj Nour El-Ahmadi, Dallas, TX (US); Salam El Ahmadi, Dallas, TX (US); Gabriel E. Cardona, Richardson, TX (US)

(73) Assignee: Menara Networks, Inc., Dallas, TX (US)

( * ) Notice: Subject to any disclaimer, the term of this patent is extended or adjusted under 35 U.S.C. 154(b) by 0 days.

(21) Appl. No.: 15/040,110

(22) Filed: Feb. 10, 2016

(65) Prior Publication Data
US 2016/0156997 A1 Jun. 2, 2016

Related U.S. Application Data

(63) Continuation of application No. 13/753,112, filed on Jan. 29, 2013, now Pat. No. 9,312,951, which is a
(Continued)

(51) Int. Cl.
*H04B 10/00* (2013.01)
*H04Q 11/00* (2006.01)
(Continued)

(52) U.S. Cl.
CPC ........ *H04Q 11/0003* (2013.01); *H04J 3/1652* (2013.01); *H04L 1/0057* (2013.01); *G02B 6/4292* (2013.01); *H04Q 2011/0079* (2013.01)

(58) Field of Classification Search
CPC .... H04B 10/40; H04B 10/43; H04Q 11/0003; H04Q 2011/0079; H04J 3/1652; G02B 6/4292; H04L 1/0057
(Continued)

(56) References Cited

U.S. PATENT DOCUMENTS 6,111,675 A * 8/2000 Mao .................. G08C 23/06
398/1
7,286,487 B2 10/2007 Perkins et al.
(Continued)

OTHER PUBLICATIONS

Mark Telford; Shrinking Transceivers Drive InP Integration; Technical Feature—InP Circuit Integration—PCT/US2007/008848 Apr. 4, 2008; III-Vs Review the Advanced Semiconductor Magazine; vol. 16—No. 5, Jun./Jul. 2003.
(Continued)

*Primary Examiner* — M. R. Sedighian
(74) *Attorney, Agent, or Firm* — Clements Bernard Walker PLLC; Lawrence A. Baratta, Jr.; Christopher L. Bernard (57) ABSTRACT

The present disclosure provides an optical transceiver, method of mapping, and method of management utilizing a plurality of Optical Channel Transport Unit layer k (OTUk) links to form an aggregate signal, such as, for example, 10 OTU2s to provide a single 100 Gigabit Ethernet (100 GbE) signal. Specifically, the present invention enables use of existing circuitry and methods at lower speed signals, e.g. 10G, to support higher speed aggregate signals, e.g. 100G. The present invention may be utilized to support carrier-grade OTN applications with optical transceivers such as, for example, pluggable optical transceivers. In an exemplary embodiment, the present invention includes a method which receives a plurality of signals, frames each of the plurality of signals into an OTUk frame, and manages/monitors each of the plurality of signals in an OTUk frame in the aggregate.

18 Claims, 11 Drawing Sheets

Related U.S. Application Data continuation-in-part of application No. 13/025,947, filed on Feb. 11, 2011, now Pat. No. 8,412,051, which is a continuation-in-part of application No. 12/120,149, filed on May 13, 2008, now Pat. No. 8,107,820, and a continuation-in-part of application No. 11/581,201, filed on Oct. 13, 2006.

(60) Provisional application No. 61/029,821, filed on Feb. 19, 2008.

(51) Int. Cl.
*H04J 3/16* (2006.01)
*H04L 1/00* (2006.01)
*G02B 6/42* (2006.01)

(58) Field of Classification Search
USPC .......................................................... 398/135
See application file for complete search history.

(56) References Cited

U.S. PATENT DOCUMENTS

| | | | |
|---|---|---|---|
| 7,286,762 B2 | 10/2007 | Elahmadi et al. | |
| 7,342,460 B2 | 3/2008 | Batchelor et al. | |
| 7,440,702 B2 | 10/2008 | Imai | |
| 7,734,177 B2 | 6/2010 | Jiang | |
| 7,787,460 B2 | 8/2010 | MacLean et al. | |
| 2003/0123493 A1 | 7/2003 | Takahashi | |
| 2004/0030965 A1 | 2/2004 | Hadjihassan et al. | |
| 2004/0033079 A1 | 2/2004 | Sheth et al. | |
| 2004/0114924 A1 | 6/2004 | Holness et al. | |
| 2004/0159776 A1 | 8/2004 | Richard et al. | |
| 2005/0063711 A1 | 3/2005 | Rossi et al. | |
| 2005/0078685 A1* | 4/2005 | MacLean | H04Q 11/0062 370/395.54 |
| 2007/0122148 A1 | 5/2007 | Welch et al. | |
| 2008/0050074 A1 | 2/2008 | Dallesasse et al. | |
| 2008/0089693 A1 | 4/2008 | El-Ahmadi et al. | |
| 2009/0169217 A1 | 7/2009 | Meagher et al. | |
| 2009/0317086 A1* | 12/2009 | Morohashi | H04B 10/40 398/135 |

OTHER PUBLICATIONS

Kazuhiko Terada, Kenji Kawai, Osamu Ishida, Keiji Kishine, Nobaru Iwasaki and Haruhiko Ichino; Physical Layer OAM&P Signaling Method for 10 Gbit/s Ethernet Transport over Optical Networks; Paper; IEICE Trans. Commun., vol. E 88 8, No. 10, Oct. 2005.

MSA Group Members; A Cooperation Agreement for 10 Gigabit Ethernet Transceiver Package; Issue 3.0, Sep. 18, 2002; XENPAK MSA.

MSA Group Members; A Cooperation Agreement for a Small Versatile 10 Gigabit Transceiver Package—Issue 2.0b, Apr. 7, 2005; X2 MSA, ZENPAK MSA.

Simon Stanley; 10-Gbit/s Ethernet Components—Session 11, 10-Gig Ethernet Transponders; Driving Growth in the Enterprise Presentation; Aug. 17, 2004.

PCT Written Opinion in PCT/US09/43749.

\* cited by examiner

VIRTUALIZED OPTICAL TRANSPORT NETWORK SYSTEMS AND METHODS

CROSS-REFERENCE TO RELATED APPLICATION(S)

This application is a continuation of co-pending U.S. patent application Ser. No. 13/753,112 filed Jan. 29, 2013, and entitled "VIRTUALIZED OPTICAL TRANSPORT NETWORK SYSTEMS AND METHODS," which claimed priority as a continuation-in-part of U.S. patent application Ser. No. 13/025,947 filed Feb. 11, 2011, and entitled "40G/100G OPTICAL TRANSCEIVERS WITH INTEGRATED FRAMING AND FORWARD ERROR CORRECTION," which claims priority to U.S. patent application Ser. No. 12/120,149 filed May 13, 2008, and entitled "SYSTEMS AND METHODS FOR THE INTEGRATION OF FRAMING, OAM&P, AND FORWARD ERROR CORRECTION IN SFP OPTICAL TRANSCEIVER DEVICES," which claims priority to U.S. Provisional Patent Application Ser. No. 61/029,821, filed Feb. 19, 2008, and entitled "SYSTEMS AND METHODS FOR ETHERNET EXTENSION AND DEMARCATION," and which is a continuation-in-part of U.S. Pat. No. 7,580,637, issued on Aug. 25, 2009, and entitled "SYSTEMS AND METHODS FOR THE INTEGRATION OF FRAMING, OAM&P, AND FORWARD ERROR CORRECTION IN PLUGGABLE OPTICAL TRANSCEIVER DEVICES," all of which are incorporated in full by reference herein.

FIELD OF THE INVENTION

The present invention relates generally to networking. More particularly, the present invention relates to an optical transceiver, method of mapping, and method of management utilizing a plurality of Optical Channel Transport Unit layer k (OTUk) links to form an aggregate signal, such as, for example, 10 OTU2s, OTU2es, or OTU1es to provide a single 100 Gigabit Ethernet (100 GbE) signal with OTN type OAM and Forward Error Correction attributes.

BACKGROUND OF THE INVENTION

As bandwidth demands continue, network operators, equipment vendors, and the like are moving towards higher and higher bit rate interfaces, e.g. 10 Gb/s to 40 Gb/s, 100 Gb/s, etc. Optical Transport Network (OTN), such as through ITU-T G.709/Y.1331 (December 2009) "Interfaces for the Optical Transport Network (OTN)", is emerging as an efficient protocol for encapsulation of various client signals such as, for example, Ethernet. Client signals in OTN may be mapped/multiplexed into various signals include Optical Channel Transport Unit layer k (OTUk) where k=1, 2, 3, etc. OTU1 is utilized for serialized 2.5 Gb/s signals, OTU2 is utilized for serialized 10 Gb/s signals, OTU3 is utilized for serialized 40 Gb/s signals, and OTU4 is utilized for serialized 100 Gb/s signals. OTU1e and OTU2e are methods identified in ITU-T G. Supplement 43 for framing 10GE LAN PHY payloads into OTU frames in an OTN based system. In various conventional embodiments, 100 Gb/s signals are being offered as 10×10 Gb/s or 4×25 Gb/s based parallelized signals. For example, routers are offering 100 Gb/s Ethernet (100 GbE) parallelized interfaces. There exists a need for an optical transceiver, mapping method, management method, and the like supporting 100 Gb/s parallelized signals while providing the benefits of OTN.

BRIEF SUMMARY OF THE INVENTION

In an exemplary embodiment, a method includes receiving a plurality of signals from a first device; framing each of the plurality of signals in an Optical Channel Transport Unit layer k (OTUk) frame; managing the plurality of signals in the OTUk frame as a single virtualized Optical Transport Network (OTN) signal; and transmitting the plurality of signals in the OTUk frame to a second device. In another exemplary embodiment, an optical transceiver includes a host interface communicatively coupling N signals comprising a single aggregated signal to a host device, N comprising an integer greater than one; N Optical Transport Network framing/de-framing circuits each communicatively coupled to the host interface; an optical interface communicatively coupled to the N Optical Transport Network framing/de-framing circuits; and a processor communicatively coupled to the N Optical Transport Network framing/de-framing circuits, the processor configured to manage N Optical Channel Transport Unit layer k (OTUk) signals from the N Optical Transport Network framing/de-framing circuits as a single virtualized Optical Transport Network (OTN) signal. In yet another exemplary embodiment, a management method includes receiving a plurality of Optical Transport Network (OTN) framed signals; processing alarm and performance monitoring data from each of the plurality of OTN framed signals; and aggregating the alarm and the performance monitoring data from each of the OTN framed signals to provide aggregate alarm and performance monitoring data for a single virtualized OTN signal comprising the plurality of OTN framed signals.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides an optical transceiver, method of mapping, and method of management utilizing a plurality of Optical Channel Transport Unit layer k (OTUk) links to form an aggregate signal, such as, for example, 10 OTU2s or OTU2es to provide a single 100 Gigabit Ethernet (100 GbE) signal with OTN type OAM and Forward Error Correction attributes. Specifically, the present invention enables the use of existing circuitry and methods at lower speed signals, e.g. 10G, to support higher speed aggregate signals, e.g. 100G. The present invention may be utilized to support carrier-grade OTN applications with optical transceivers such as, for example, pluggable optical transceivers. In an exemplary embodiment, the present invention includes a method which receives a plurality of signals, frames each of the plurality of signals into an OTUk frame and manages/monitors each of the plurality of signals in an OTUk frame in the aggregate. The optical transceiver may be compliant to one or more Multi-Source Agreements (MSAs) such as XFP, XPAK, XENPAK, X2, XFP-E, SFP, SFP+, and 300-pin. Exemplary MSAs for 40G and 100G include CFP and variants thereof (e.g., future CFP2, CDFP, CXP), OIF-MSA-100GLH-EM-01.0—Multisource Agreement for 100G Long-Haul DWDM Transmission Module—Electromechanical (June 2010) (hereinafter MSA-100GLH), CCRx (Compact Coherent Receiver), Quad Small Form-factor Pluggable (QSFP) and variants thereof (e.g., future QSFP+, QSFP2), 10×10 MSA, and the like.

Figure 1:
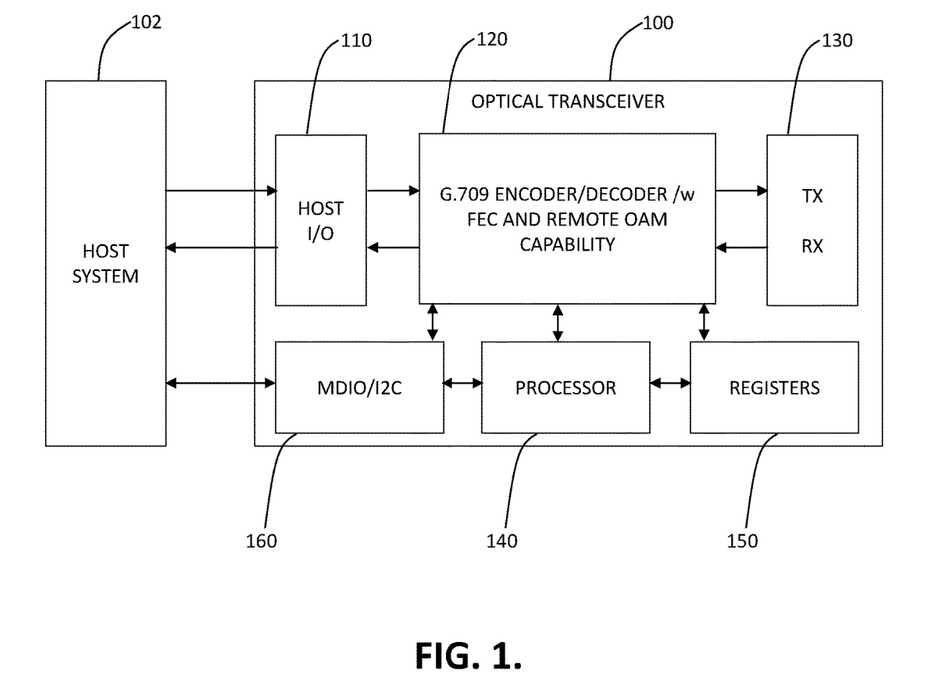
FIG. 1 is a block diagram of functionality of an optical transceiver configured to provide virtualized OTN.

Referring to FIG. 1, in an exemplary embodiment, a block diagram illustrates the functionality of an optical transceiver 100. The optical transceiver 100 may include any MSA-compatible optical transceiver. The present invention includes additional circuitry on the optical transceiver 100 to provide integrated framing functionality, optical layer operations, administration, maintenance, and provisioning (OAM&P), forward error correction (FEC), data encapsulation, performance monitoring, and alarming in the optical transceiver 100. This additional circuitry is configured to preserve the specifications of the MSA defining the optical transceiver 100. Accordingly, the optical transceiver 100 is configured to operate in any host system 102 configured to operate according to the MSA specifications. The optical transceiver 100 includes a host input/output (I/O) module 110, a G.709 encoder/decoder 120, a Tx/Rx module 130, a processor 140, registers 150, and an MDIO/I2C interface 160. Note, the various modules 110, 120, 130, 140, 150, 150 can be integrated within various ASICs on the optical transceiver 100. The host I/O module 110 is configured to interface with the host system 102 according to the MSA specifications. For example, the module 110 can include a XAUI, CAUI, serial interface, or the like. The G.709 encoder/decoder 120 is configured to frame/un-frame, encode/decode FEC, and process overhead integrated within the optical transceiver 100 while preserving the MSA specifications. The Tx/Rx module 130 provides the physical optical input/output.

The optical transceiver 100 includes a processor 140 which is communicatively coupled to the G.709 encoder/decoder 120, the Tx/Rx module 130, the registers 150, and the MDIO/I2C interface 160. The processor 140 is a hardware device for executing software instructions. The processor 140 may be any custom made or commercially available processor, a central processing unit (CPU), an auxiliary processor among several processors, a semiconductor-based microprocessor (in the form of a microchip or chip set), or generally any device for executing software instructions. In an exemplary embodiment of the present invention, the processor 140 is configured to process and provide performance monitoring (PM) data and alarming based on the overhead and FEC from the G.709 encoder/decoder 120. Additionally, the processor 140 is configured to export PM and alarm data off the optical transceiver 140 through the MDIO/I2C interface 160. For example, the processor 140 can be configured to bridge data on the MDIO/I2C interface 160 through unused registers in the MSA specification to provide an MSA-compliant mechanism to report the data to the host system 102. Additionally, the processor 140 can export the PM and alarm data to a far-end through overhead in the G.709 encoder/decoder 120.

The G.709 encoder/decoder 120 is configured to transmit/receive a signal to/from the host I/O 110. The signal is decoded/encoded with FEC and de-framed/framed with overhead. The G.709 encoder/decoder 120 is configured to strip out incoming overhead, and process the overhead in conjunction with the processor 140. Advantageously, the integration of framing, FEC, and OAM&P into the MSA optical transceiver 100 enables performance monitoring and alarming at a carrier-grade level without extra equipment. This functionality is integrated into the optical transceiver 100 while preserving the existing MSA specifications. Accordingly, the optical transceiver 100 can operate in any MSA-compliant host system 102. The host system 102 can be configured to retrieve PMs and alarms from the optical transceiver 100 through software modifications only, i.e. to read the registers used for this data.

The optical transceiver 100 can operate in a transparent mode and an enhanced mode. In the transparent mode, the module can be used with existing host device 102 driver software without any alteration. In this mode, the OTN framing and Forward Error Correction features are always turned on but all associated Overhead Management information is terminated within the optical transceiver 100 and is transparent to the host device 102 driver software. The optical transceiver 100 is built with the necessary intelligence to recognize the IEEE standardized 100GE mode the host device 102 wants to configure by monitoring MSA registers or determining the individual electrical lane timing and/or lane framing and sets all appropriate OTN frame registers, VCXO frequencies, etc. . . . to accommodate the proper OTN bit rate for the mode selected. In the Transparent Mode, the optical transceiver 100 offers 4× or higher DWDM performance and enhanced reach thanks to the Forward Error Correction coding gain feature.

In the Enhanced mode, the host can also turn on and off the OTN and FEC features. In this mode, the host has full accessibility to all the OTN G.709 OAM features so that an optical interface with OTN based alarms, performance monitoring parameters, maintenance signaling, provisioning and forward error correction can be supported and exposed to a higher layer software entity. Management data from and to the host is supported via the standard MDIO/I2C interface 2460 (so no hardware change is necessary). Network operators can access various components of the overhead on the optical transceiver 100 through the host system 102 and the MDIO/I2C interface 160. The host system 102 can be configured to retrieve various PMs and alarm information from the registers 150 through the MDIO/I2C interface 160. This information can be imported through the host system 102 to an EMS system for access by network operators. The present invention contemplates access to all alarms in ITU-T G.709, all six Tandem Connection Monitoring (TCM) bytes in G.709, far end monitoring as specified in G.709, loopbacks, historical and real-time PM values for FEC, section, and path, and the like.

Figure 2A:
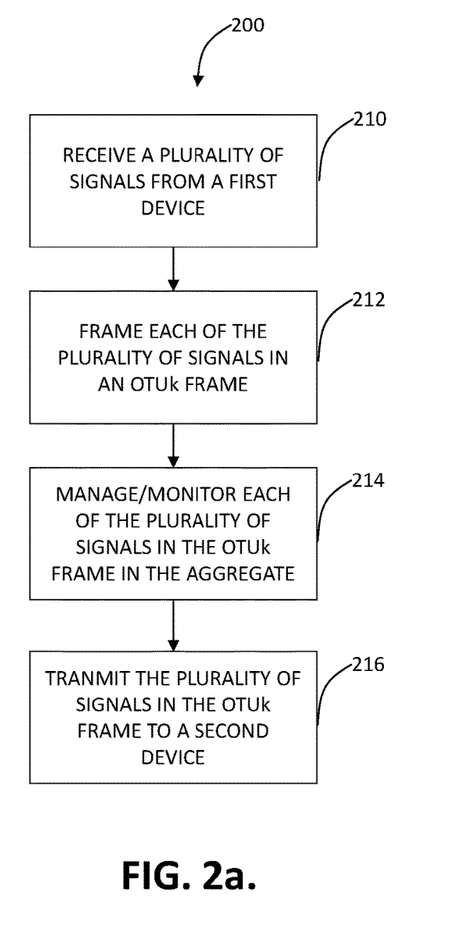
FIGS. 2a and 2b are flowcharts of virtualized OTN methods according to the present invention.
Figure 2B:
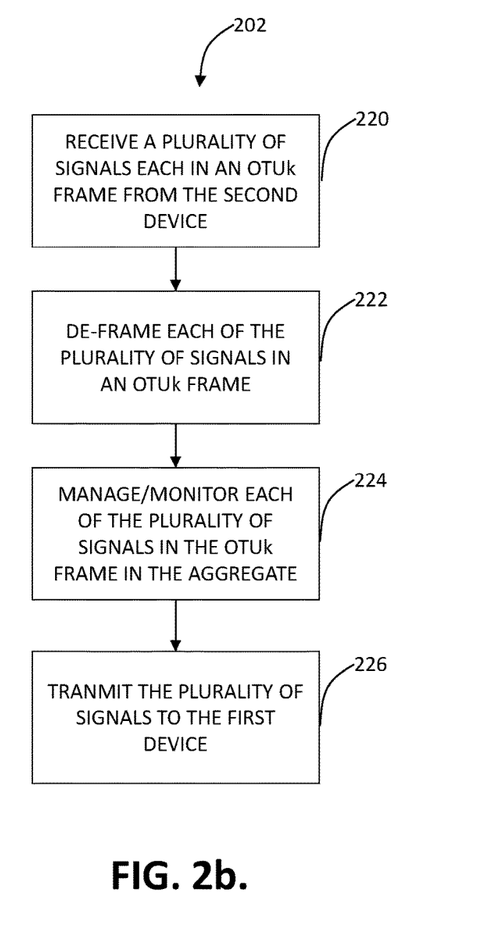

Referring to FIGS. 2a and 2b, in an exemplary embodiment, a flowchart illustrates virtualized OTN methods 200, 202 according to the present invention. As described herein, the OTN method 200 may be implemented by optical transceivers, such as the optical transceiver 100, that carry an aggregate signal (e.g., 100G) as a plurality of parallelized signals (e.g., 10×100G, 4×25G) allowing the parallelized signals to include OTN framing that is managed in an aggregate fashion. The methods 200, 202 are illustrated in two parts showing bidirectional transmission with the method 200 of FIG. 2a referring to transmission from the host device and the method 202 of FIG. 2b referring to transmission to the host device. Those of ordinary skill in the art will recognize that the methods 200, 202 are implemented concurrently through one or more optical transceivers.

In FIG. 2a with respect to the method 200, a plurality of signals is received from a first device (step 210). The plurality of signals includes N×M signals where N is the number of the plurality of signals and M is a rate of each of the plurality of signals. Thus, an aggregate signal would by N×M of a rate. In an exemplary embodiment, the plurality of signals may include 10×10 Gb/s signals forming an aggregate 100 Gb/s signal. The first device may include a host device, a DWDM device or components, a router, a switch, an optical cross-connect, a SONET/SDH/OTN terminal, or any other device configured to transmit the plurality of signals. The present invention also contemplates other values for N and M. Each of the plurality of signals is a frame in an OTUk frame (step 212). Here, the plurality of signals is each framed separately into a lower value OTUk frame than the aggregated would require. For example, in the case of 10×10 Gb/s, each of the plurality of signals is framed in an OTU2 or OTU2e whereas an aggregate 100 Gb/s signal would require an OTU4. The method 200 manages/monitors each of the plurality of signals in the OTUk frames in the aggregate (step 214). Using the 10×10 Gb/s example, the method 200 treats the 10 OTU2s or OTU2es as a single entity from a management perspective (e.g., OAM&P). That is, alarms, performance monitoring (PM) data, and another OTN-related data is aggregated and provided as a single unit. Finally, the plurality of signals in the OTUk frames are transmitted to a second device (step 216). Similar to the first device, the second device may include a host device, a DWDM device or components, a router, a switch, a optical cross-connect, a SONET/SDH/OTN terminal, or any other device configured to transmit the plurality of signals. In one exemplary embodiment, the first device may include a host device and the second device may include DWDM components, such as multiplexers, dispersion compensation modules, etc.

In FIG. 2b with respect to the method 202, a plurality of signals each in an OTUk frame are received from the second device (step 220). The method 202 may be viewed as the receive side whereas the method 200 is the transmit side (from the perspective of an optical transceiver performing the methods 200, 202). Each of the plurality of signals in the OTUk frame is de-framed (step 222). The method 202 is configured to manage/monitor the plurality of signals in the OTUk frame in the aggregate (step 224). Specifically, the steps 212, 214 and the steps 222, 224 may be implemented concurrently with one another. That is, the methods 200, 202 manage/monitor the plurality of signals in the framing/de-framing process. Finally, the method 202 transmits the plurality of signals to the first device. Specifically, in the methods 200, 202, the first device is configured to transmit/receive the plurality of signals unframed while the second device is configured to transmit/receive the plurality of signals framed in the OTUk frames.

Figure 3A:
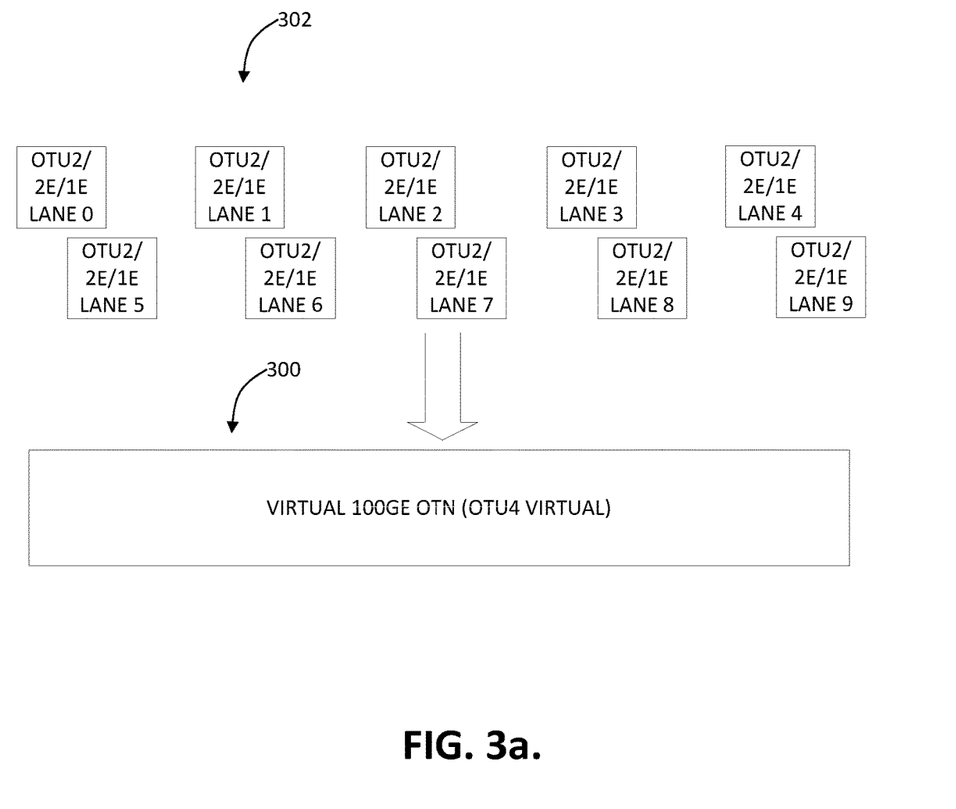
FIGS. 3a and 3b are block diagrams of a pictorial representation of a virtualized OTN signal.
Figure 3B:
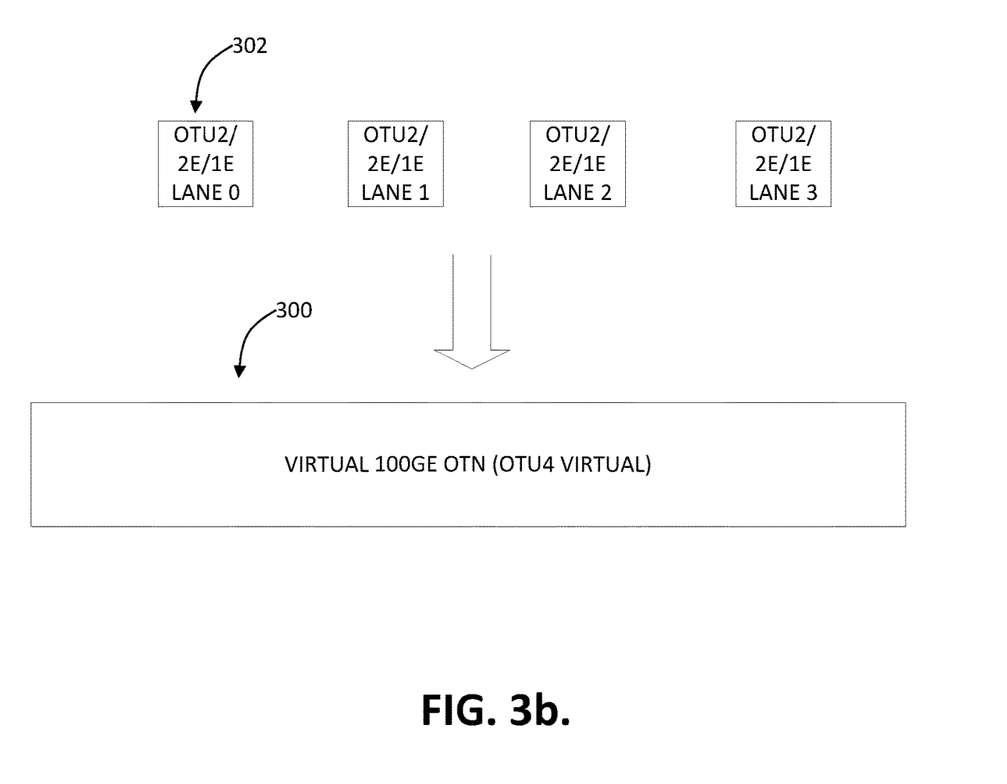

Referring to FIG. 3, in an exemplary embodiment, a block diagram illustrates a pictorial representation of a virtualized OTN signal 300. In particular, the virtualized OTN signal 300 may be a 100 GbE payload signal that includes 10 OTU2 or OTU2e lanes 302 each of 10 Gb/s. That is the virtualized OTN 300 is an aggregate 100 GbE signal of 10 OTU2 or OTU2e signals that are managed as the single virtualized OTN signal 300. In an exemplary application, the virtualized OTN signal 300 may be used for a 100 GbE router/switch interface that provides 10×10G output. Further, the virtualized OTN 300 may be used to transmit the 100 GbE interface over a DWDM system as 10×10G while allowing OTN capability via the 100×OTU2 or 10×OTU2e signals.

Figure 4A:
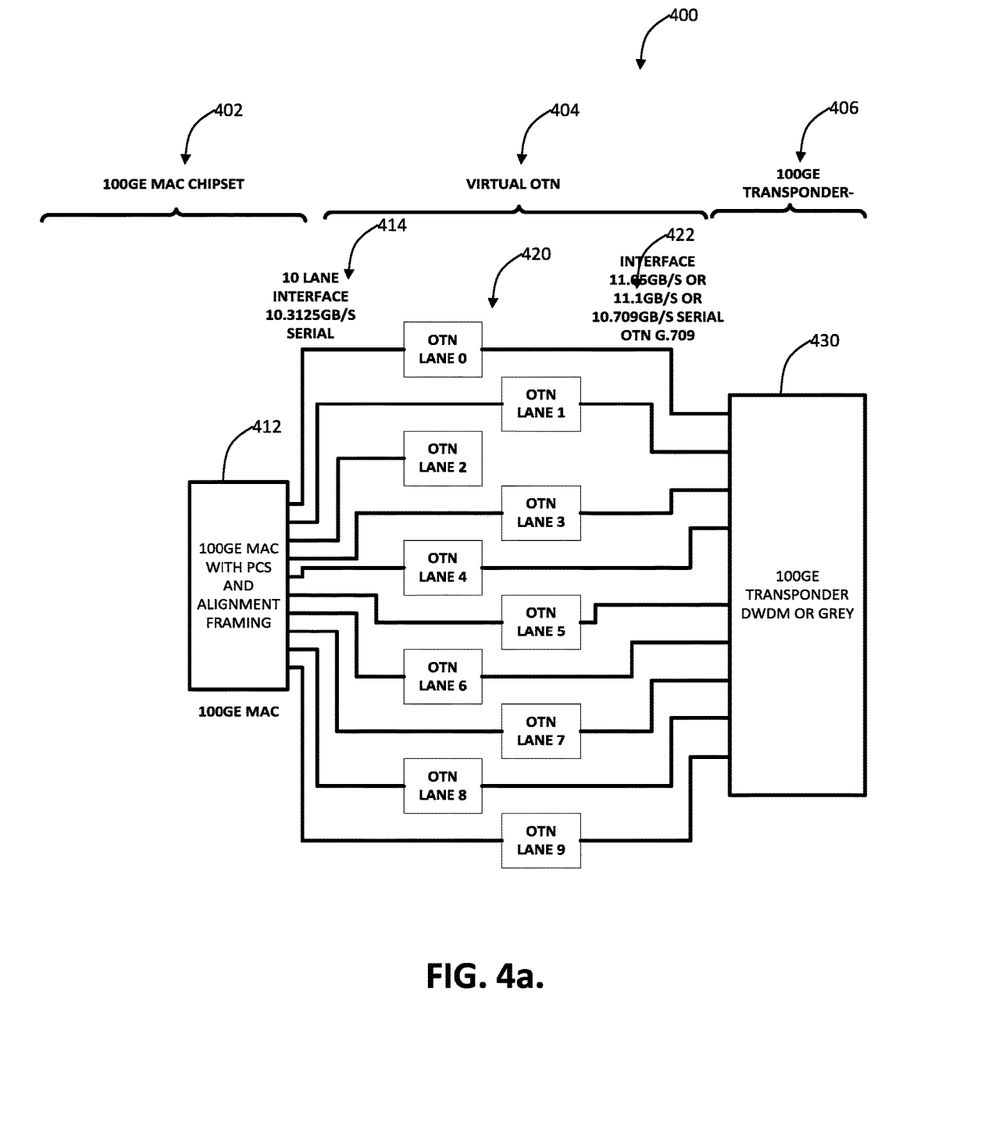
FIGS. 4a, 4a', 4b, and 4b' are block diagrams of an exemplary implementation of a virtualized OTN system.

Referring to FIGS. 4a, 4a', 4b, and 4b', in an exemplary embodiment, a block diagram illustrates an exemplary implementation of a virtualized OTN system 400. In particular, the virtualized OTN system 400 may include a host interface section 402, an OTU2, OTU1e OTU2e framing section 404, an optical transponder section 406, and a management section 408. FIGS. 4a and 4a' illustrates the host interface section 402, the OTU2 framing section 404, and the optical transponder section 406, and FIGS. 4b and 4b's illustrates the management section 408 for FIGS. 4a and 4a' respectively. FIG. 4a is a 10×10 implementation and FIG. 4a' is a 4×25 implementation. Further, the exemplary embodiment of FIGS. 4a, 4a', 4b, and 4b' includes a 100 GbE aggregate signal formed by 10 OTU2, OTU1e or OTU2e. This is presented for illustration purposes, and those of ordinary skill in the art will recognize the present invention contemplates other aggregate bit rates formed from various signals (N×M). In an exemplary embodiment, the host interface section 402 may be included in a host system such as a router, switch, etc. and the OTU2 framing section 404, the optical transponder section 406, and the management section 408 may be included in an optical transceiver such as the optical transceiver 100 of FIG. 1.

The host interface section 402 is configured to interface a plurality of signals, e.g. 10 of 10 Gb/s, between a host device (not shown) and the OTU2, OTU1e or OTU1e framing section 404. For example, the host interface section 402 may or may not reside on the host device. Also, the host device may include a 100 GbE Ethernet switch or router. The host interface section 402 includes two 50G interfaces that interface to a 100 GbE media access controller (MAC) with Physical Coding Sublayer (PCS) and alignment framing section 412. The section 412 outputs 10 signals to the OTU2 framing section 404 via Multi-Lane Distribution (MLD) or CAUI interfaces 414 which are 10 lanes of 10.3125 Gb/s serial 66/64B signals. Each of the interfaces 414 is coupled to an OTN framer 420 that is configured to frame/de-frame the signal into an OTU2, OTU1e or OTU2e. In an exemplary embodiment, the OTN framers 420 may include the G.709 encoder/decoder 120. Note, the functionality of the G.709 encoder/decoder 120 is described in further detail in U.S. Pat. No. 7,580,637, issued on Aug. 25, 2009, and entitled "SYSTEMS AND METHODS FOR THE INTEGRATION OF FRAMING, OAM&P, AND FORWARD ERROR CORRECTION IN PLUGGABLE OPTICAL TRANSCEIVER DEVICES," from which the present application claims priority.

Each of the OTN framers 420 is coupled via the optical transceiver or transponder MSA defined electrical interfaces 422 to a 100 GbE transponder or transceiver 430. The transponder or transceiver 430 is configured to transmit each of the OTU2, OTU2e or OTU1e signals, such as, for example, over a DWDM system or the like. Thus, an input to the virtualized OTN system 400 may include 10 unframed signals at 10 Gb/s forming a 100 GbE aggregate and an output of the virtualized OTN system 400 via the transponder 430 may include 10 OTU2 signals forming a virtualized OTN signal 300. Advantageously, the virtualized OTN system 400 may reuse existing OTU2, OTU2e or OTU1e circuitry via the OTN framers 420 while providing 100 GbE support. In an exemplary embodiment, the transponder 430 may include a CFP or variant thereof or a 10×10 compliant transceiver. Also, the transponder 430 may include DWDM interfaces, coarse WDM (CWDM) interfaces, etc.

Figure 4B:
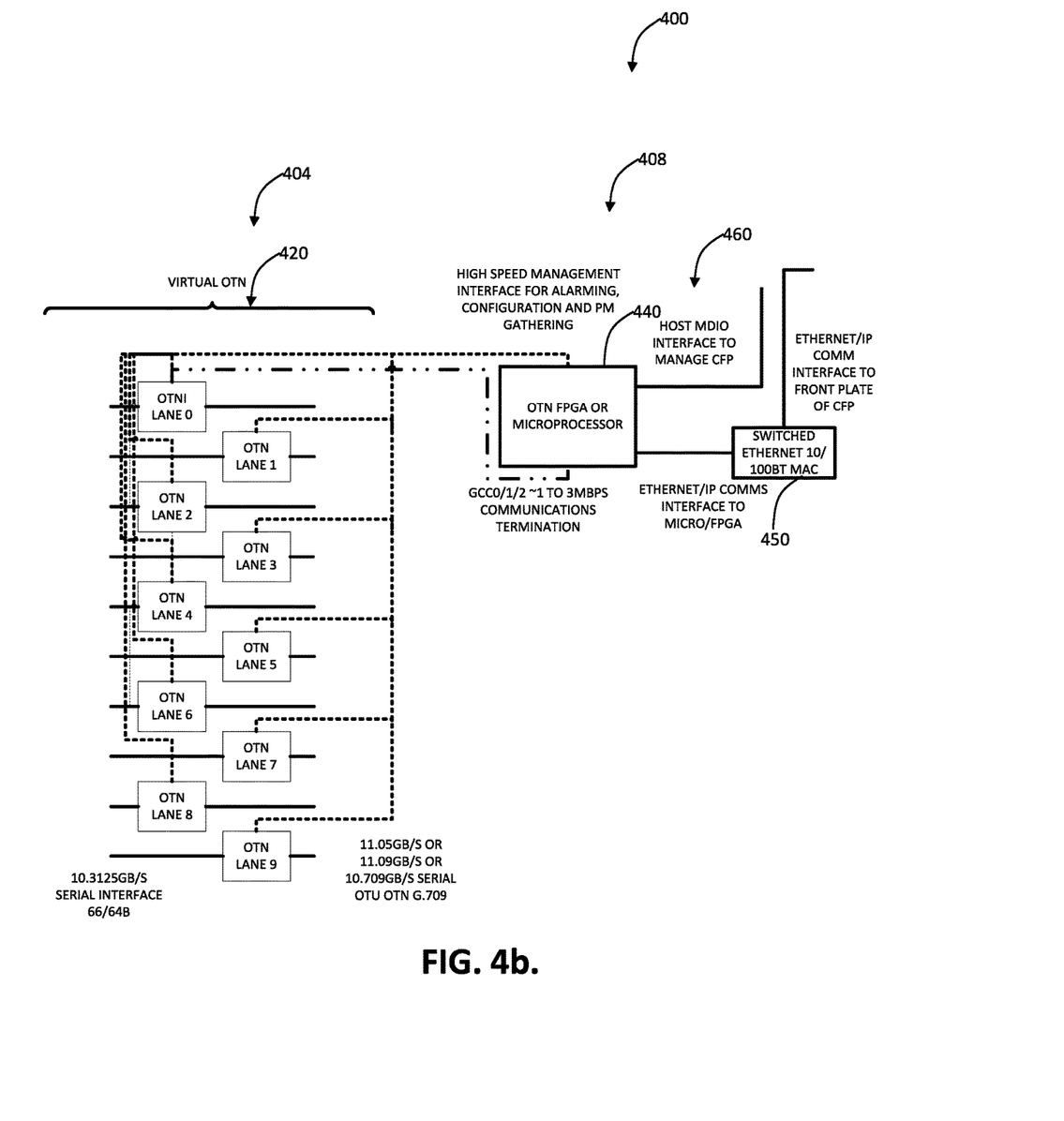

The management section 408 includes an OTN field programmable gate array (FPGA) or microprocessor 440 communicatively coupled to each of the OTN framers 420 and optionally an Ethernet switch 450 communicatively coupled to the microprocessor 440. The microprocessor 440 in cooperation with the OTN framers 420 is configured to process the overhead of the OTUk signals in the virtualized OTN system 400. Specifically, the communication link between the microprocessor 440 and the OTN framers 420 includes a high-speed management interface for alarming, configuration, and performance monitoring gathering as well as General Communication Channel (GCCO/1/2) relay with the OTN framers 420. The microprocessor 440 is configured to consolidate alarms, performance monitoring data, etc. from the OTN framers 420 and to provide an interface 460 to a host system, such as an MDIO, for example. In an exemplary embodiment, the Ethernet switch 450 may provide a physical Ethernet connection to provide OAM&P data to/from the microprocessor 440 through telnet, ssh, HTTP, SNMP or other like management interfaces.

Figure 5A:
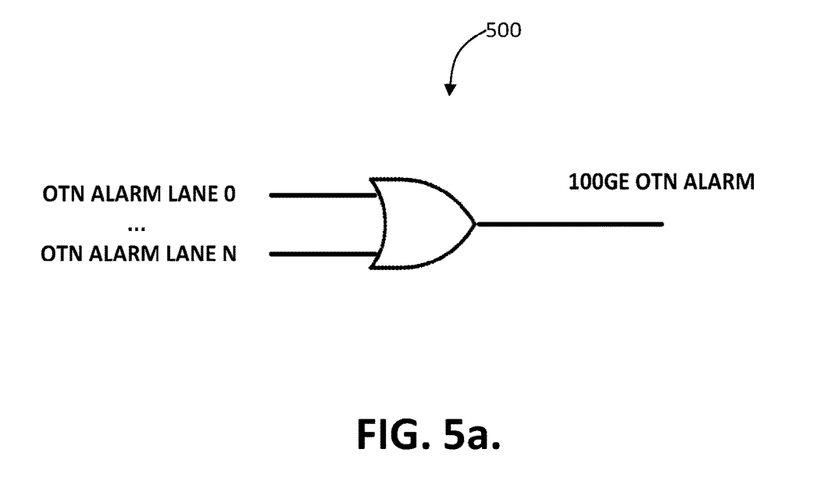
FIGS. 5a and 5b are logic diagrams of virtual OTN alarming and virtual OTN performance monitoring.
Figure 5B:
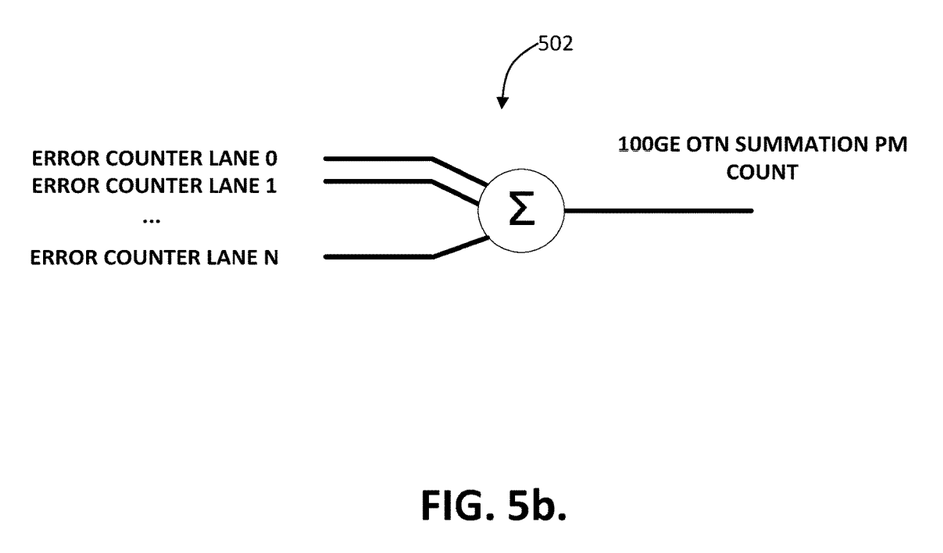

Referring to FIGS. 5a and 5b, in an exemplary embodiment, logic diagrams illustrate virtual OTN alarming 500 and virtual OTN performance monitoring 502 such as through the microprocessor 440. As described herein, the virtualized OTN system 400 is managing N×OTUk signals, e.g. 10×OTU2. Thus, from an OTN perspective, there are discrete alarms and performance monitoring data on each of the N OTUk signals, but the virtualized OTN system 400 manages the N OTUk signals in the aggregate. In general, the virtualized OTN system 400 may perform a logical AND function on alarms from individual OTUk signals and raise an alarm on the aggregate if any of the individual OTUk signals exhibits that alarm. The virtualized OTN system 400 may perform a summation of the performance monitoring data for the individual OTUk signals and present the sum as the aggregate. Also, for G.709 defined trail trace and maintenance signaling, the virtualized OTN system 400 may arbitrarily use the first OTUk signal. Further, the virtualized OTN system 400 may present alarms and performance monitoring data from both discrete lanes (i.e., from the individual OTN framers 420) as well as an aggregate.

In an exemplary embodiment, the following table illustrates OTN alarms and the corresponding discrete lane alarms and the virtual OTN alarm.

| OTN Alarm | Discrete Lane Alarm | Virtual 100GE OTN Alarm |
|---|---|---|
| Loss of Signal (LOS) | None | Taken from Front end or Optical Power |
| Loss of Frame (LOF) | Lane 0 to 9 | OR (Lane 0-Lane 9 LOF) |
| Trail Trace Identifier Mismatch TTI-M (OTU, Optical Channel Data Unit (ODU), Tandem Connection Monitoring (TCMk)) | Lane 0 | Lane 0 TTI-M |
| Incoming alignment error IAE (OTU and TCMk) | Lane 0 to 9 | OR (Lane 0-Lane 9 LOF) |
| Lockout LCK (ODU, TCMk) | Lane 0 | Lane 0 LCK Only |
| Open Connection Indication (OCI) (ODU, TCMk) | Lane 0 | Lane 0 OCI Only |

| OTN Alarm | Discrete Lane Alarm | Virtual 100GE OTN Alarm |
|---|---|---|
| Loss of Multiframe (LOM) | Lane 0 to 9 | OR (Lane 0-Lane 9 LOM) |
| Backward Defect Indicator BDI (OTU, ODU, TCMk) | Lane 0 to 9 | OR (Lane 0-Lane 9 BDI) |
| Alarm Indication Signal AIS (OTU, ODU, TCMk) | Lane 0 to 9 | OR (Lane 0-Lane 9 AIS) |
| Payload type indicator PTI-M | Lane 0 | Lane 0 PTI-M Only |

In an exemplary embodiment, the following table illustrates OTN performance monitoring data and the corresponding discrete lane performance monitoring data and the virtual OTN performance monitoring data. The following abbreviations are used in the following table: EB—Errored Blocks, BBE—Background Block Errors, ES—Errored Seconds, SES—Severely Errored Seconds, UAS—Unavailable Seconds, BIP-8—Bit-Interleaved Parity 8, FCE—FEC Corrected Errors. Other performance monitoring parameters as described in G.8201 are also derived in the same method of aggregating error counters from each discrete lane and showing the performance monitoring parameter in the aggregate.

| OTN PM Data | Discrete Lane PMs | Virtual 100GE OTN PM Data |
|---|---|---|
| FEC Corrected Errors (0, 1, Total) | Lane 0 to Lane 9 | Summation of Lane 0 to Lane 9 |
| EB, BBE, ES, SES, UAS (OTU, ODU, TCMk) | Lane 0 to Lane 9 | Summation of Lane 0 to Lane 9 |
| BIP-8 (OTU, ODU, TCMk) | Lane 0 to 9 | Summation of Lane 0 to Lane 9 |
| FCE Deg, FCE Fail | Lane 0 to 9 | Avg across Lane 0 to Lane 9* |
| Signal Degrade, Fail (OTU, ODU, TCMk) | Lane 0 to Lane 9 | Summation of Lane 0 to Lane 9 |

Figure 6:
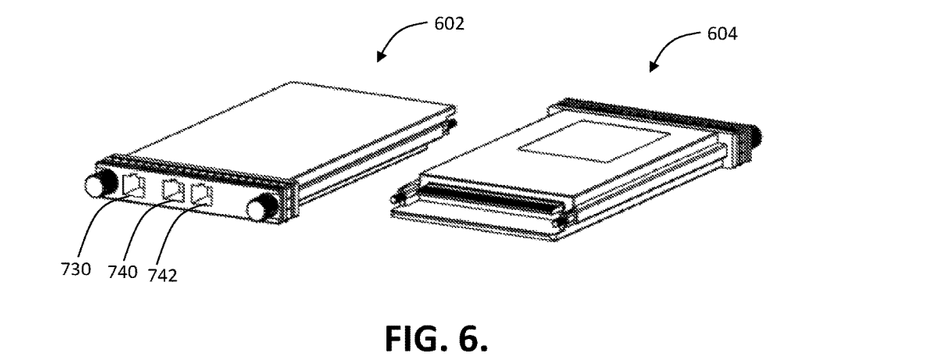
FIG. 6 is a perspective diagram of a CFP module in a front view and a rear view.

Referring to FIG. 6, in an exemplary embodiment, a perspective diagram illustrates a CFP module 600 in a front view 602 and a rear view 604. The present invention can incorporate the integrated functionality described herein in 40 Gb/s and 100 Gb/s optical transceivers such as CFP and variants thereof (e.g., future CFP2, CDFP, CXP), MSA-100GLH, CCRx, QSFP and variants thereof (e.g., future QSFP+, QSFP2), 10×10, and the like. The CFP module 600 is compliant to the CFP MSA Rev. 1.4 (June 2010) (available at www.cfp-msa.org and incorporated by reference herein). The CFP MSA defines a hot-pluggable optical transceiver form factor to enable 40 Gb/s and 100 Gb/s applications, including next-generation High-Speed Ethernet (40 GbE and 100 GbE). The electrical interface may include a nominal signaling lane rate is 10 Gbit/s per lane with various electrical interface specifications such as CAUI, XLAUI, OTL4.10, OTL3.4, and STL256.4. Other variants of CFP may include CFP2, which uses a signaling lane rate of 25 Gbit/s per lane. For example, the CFP MSA has an electrical interface of 4×10G (XLAUI) or 10×10G (CAUI), the CFP2 MSA has an electrical interface of 4×25G (CAUI2 or CPPI2). Another variant of CFP may include CDFP, which uses a signaling lane rate of 25 Gbit/s per lane and has an electrical interface of 16×25G providing 400G. The CXP MSA was created to satisfy the high-density requirements of the data center, targeting parallel interconnections for 12×QDR InfiniBand (120 Gbps), 100 GbE, and proprietary links between systems collocated in the same facility. The InfiniBand Trade Association (www.infinibandta.org) is currently standardizing the CXP. The CXP is 45 mm in length and 27 mm in width, making it slightly larger than an XFP. It includes 12 transmit and 12 receive channels in its compact package.

Figure 7:
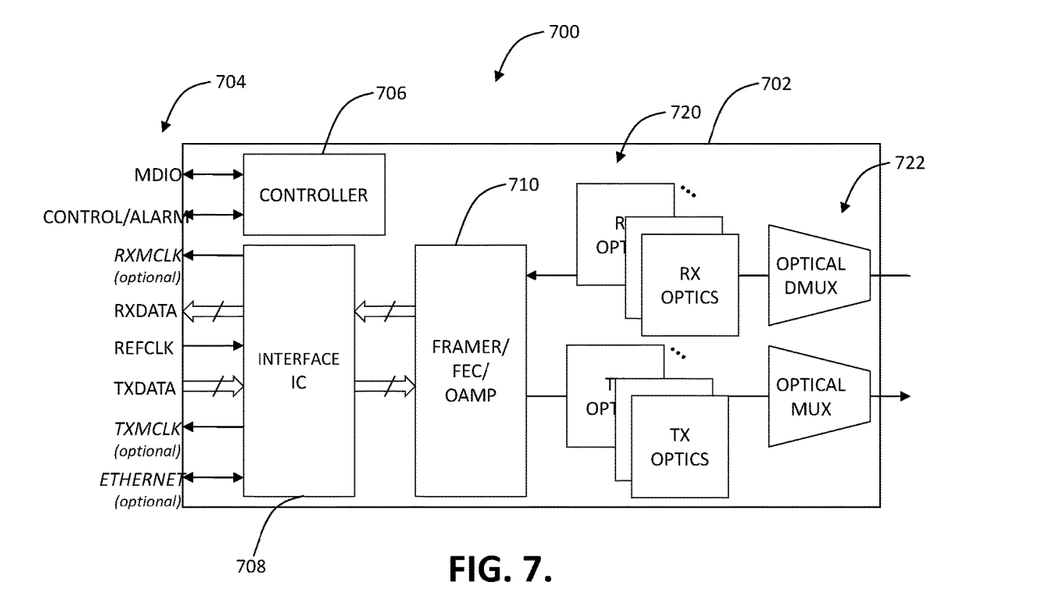
FIG. 7 is a block diagram of a CFP module integrated framing, FEC, PMs, OAM&P, alarming, etc. while preserving the CFP MSA specifications.

Referring to FIG. 7, in an exemplary embodiment, a block diagram illustrates a CFP module 700 with integrated framing, FEC, PMs, OAM&P, alarming, etc. while preserving the CFP MSA specifications. As described herein, the CFP module 700 is configured to interoperate with any standard CFP host system without requiring hardware and/or software modification of the CFP host system. Optionally, the CFP host system may include software modifications to communicate OAM&P, PM, etc. data on/off the CFP module 700 using standardized CFP communications techniques. The CFP module 700 and the CFP host system are hot-pluggable. In particular, the CFP module 700 includes a physical housing 702 that is illustrated in FIG. 6. The CFP module 700 includes a plurality of interfaces 704 that interconnect with the CFP host system. For example, the plurality of interfaces 704 may include an MDIO, a control/alarm interface, an optional receive monitor clock (RXMCLK), receive data (RXDATA), a reference clock (REFCLK), transmit data (TXDATA), an optional transmit monitor clock (TXMCLK), and an optional communications interface. The optional communications interface may directly provide OAM&P, PM, etc. data from the CFP module 700, and the optional communications interface may include I2C, Serial Peripheral Interface (SPI), RS-232, Ethernet, Ethernet over Universal Serial Bus (USB), Proprietary USB, and the like.

The CFP module 700 includes a controller 706, an interface integrated circuit 708, a framer/FEC/OAM&P circuit 710, optical interfaces 720, and optical demultiplexer/multiplexer 2522. It should be appreciated that the block diagram of FIG. 7 is an oversimplified illustration of the CFP module 700 and a practical embodiment may include other components which are not illustrated. The controller 706, the interface integrated circuit 708, and the framer/FEC/OAM&P circuit 710 generally include electrical circuits, such as ASICs, FPGAs, microprocessors, digital signal processors, timing conversion and control circuits, or other types of logic processing devices configured to operate on digital electrical signals. The controller 706 is generally configured to operate the functionality of the CFP module 700 and to interface MDIO, control, and alarming data to the CFP host system. The interface integrated circuit 708 is configured to provide the various interfaces to/from the CFP host system. The framer/FEC/OAM&P circuit 710 is configured to provide framing, FEC, and OAM&P on a client signal within the CFP module 700 while concurrently preserving the MSA specifications such that the CFP module 700 can operate in any CFP compliant host system. In an exemplary embodiment, the controller 706, the interface integrated circuit 708, and the framer/FEC/OAM&P circuit 710 may be integrated into a single circuit. In another exemplary embodiment, the interface integrated circuit 708 and the framer/FEC/OAM&P circuit 710 may be integrated into a single circuit. In yet another exemplary embodiment, the various circuits 706, 708, 710 may be realized in separate circuits with interconnects therebetween.

As described herein, the CFP module 700 of the present invention includes the framer/FEC/OAM&P circuit 710 integrated within the CFP module 700 for providing integrated framing, FEC, OAM&P, etc. within a standard CFP MSA compliant device. That is, the CFP module 700 may operate in any CFP compliant host device, and has the added functionality of integrated framing, FEC, OAM&P, etc. In an exemplary embodiment, the framer/FEC/OAM&P circuit 710 is configured to frame each 10G in 4×10G or each 25G in 4×25G in an OTN-based wrapper with OAM&P overhead and FEC. In another exemplary embodiment, the framer/FEC/OAM&P circuit 710 is configured to frame the 4×10G as a single 40G or the 4×25G as a single 100G in an OTN-based wrapper with OAM&P overhead and FEC. Generally, the framer/FEC/OAM&P circuit 710 may operate in a similar fashion as described herein with other MSAs such as XFP, XPAK, XENPAK, X2, XFP-E, SFP, SFP+, and 300-pin.

In an exemplary embodiment, the interfaces 704 may include a communications interface that is shown on the front of the CFP module 600 in FIG. 6 as Ethernet port 730 in addition to optical ports 740, 742. In the CFP MSA, the optical ports 740, 742 provide optical transmit and receive ports. The present invention may add the Ethernet port 730 as a third port on the front of the CFP module 700 for purposes of OAM&P (Operations, Administration, Management, and Provisioning), PMs, etc. That is, the controller 706 may include an Ethernet switch which provides notification of alarming, PM, OAM&P, etc. data to/from the CFP module 700. The Ethernet port 730 allows a full complement of OTN overhead data to be pulled off the CFP module 700. Also, the Ethernet port 730 may be connected in a daisy chain fashion to other Ethernet ports 730 on other CFP modules 700 with one of the daisy-chained Ethernet port 730 connected to a network management system. The Ethernet port 730 is presented for illustration purposes, and this may alternatively be any of I2C, SPI, RS-232, Ethernet, Ethernet over USB, Proprietary USB, and the like. In another exemplary embodiment, the CFP module 700 may utilize the standard MDIO interface in the interfaces 704 to provide OAM&P data to/from the CFP module 700. The CFP MDIO implementation is defined in a separate document entitled, "CFP MSA Management Interface Specification". Similarly, as described herein, the CFP module 700 may utilize undefined or optional registers to provide OAM&P data to the host system.

Figure 8:
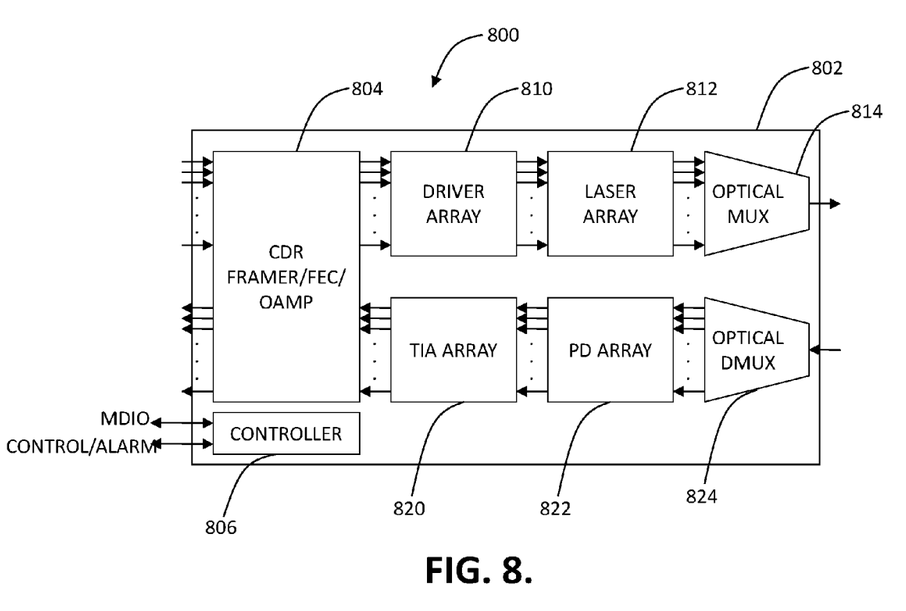
FIG. 8 is a block diagram illustrates a 10×10 module with integrated framing, FEC, PMs, OAM&P, alarming, etc. while preserving the 10×10 and CFP MSA specifications.

Referring to FIG. 8, in an exemplary embodiment, a block diagram illustrates a 10×10 module 800 with integrated framing, FEC, PMs, OAM&P, alarming, etc. while preserving the 10×10 and CFP MSA specifications. The 10×10 MSA provides a low-cost 100 GbE solution over single mode fiber using 10×10G, i.e. ten 10G signals in parallel. Specifically, the 10×10 MSA is available at www.10×10msa.org/. The 10×10 MSA is compliant with IEEE 802.3ba CAUI, MLD, MAC structure, and the CFP MSA. Of note, the 10×10 MSA utilizes the same form factor as CFP for electrical, mechanical, and firmware interfaces. Those of ordinary skill in the art will recognize that CFP and variants thereof (e.g., future CFP2, CDFP, CXP), MSA-100GLH, CCRx, QSFP and variants thereof (e.g., future QSFP+, QSFP2), 10×10, etc. are presented as exemplary embodiments, and the present invention contemplates use of integrated framing, FEC, PMs, OAM&P, alarming, etc. with any particular MSA agreement including newly defined agreements.

As described herein, the 10×10 module 800 is configured to interoperate with any standard 10×10 MSA host system without requiring hardware and/or software modification of the 10×10 MSA host system. Optionally, the 10×10 MSA host system may include software modifications to communicate OAM&P, PM, etc. data on/off the 10×10 module 800 using standardized 10×10/CFP MSA communications techniques. The 10×10 module 800 includes a physical housing 802. The 10×10 module 800 also includes a CDR/framer/FEC/OAM&P circuit 804 and a controller 806 each of which interfaces with the 10×10 MSA host system. The circuit 804 is configured to perform clock and data recovery and to generally interface to the host system with ten lanes of 10G. Additionally, the circuit 804 is configured to provide framing, FEC, OAM&P, alarming, etc. within the 10×10 module 800 while still maintaining compatibility with the 10×10 MSA and the CFP MSA. The 10×10 module 800 further includes on the transmit side a driver array 810, a laser array 812, and an optical multiplexer 814 which collectively drive ten wavelengths at 10G each and then combine them via the multiplexer 814, On the receive side, the 10×10 module 800 includes a transimpedance amplifier array 820, a photodiode array 822, and an optical demultiplexer 824 which collectively receive a WDM signal of ten wavelengths at 10G each and demultiplex and convert to electrical for processing by the circuit 804. Note, since the 10×10 MSA is also compliant with the CFP MSA, the 10×10 module 800 may use similar mechanisms as described herein with respect to the CFP module 700 for communicating with the host system or through the Ethernet port 730.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical transceiver comprising:
   a plurality of framers each configured to frame one of N signals each at a rate M, N being an integer;
   management circuitry communicatively coupled to each of the plurality of framers, wherein the management circuitry is configured to aggregate data from each of the framed N signals for management of the N signals as a single virtualized framed signal,
   wherein the management circuitry is configured to aggregate data by summing performance monitoring data in overhead from each of the framed N signals and performing a logical OR function on alarm data in the overhead from each of the framed N signals.

2. The optical transceiver of claim 1, further comprising:
   optical components configured to optically interface each of the framed N signals, wherein each of the framed signals is separately framed and optically interfaced and the management circuitry is configured to collectively manage the framed N signals as the single virtualized framed signal.

3. The optical transceiver of claim 1, further comprising:
   a management interface communicatively coupled to a host system operating the optical transceiver, wherein the management interface interfaces operations, administration, maintenance, and provisioning (OAM&P) data with the host system for the single virtualized framed signal.

4. The optical transceiver of claim 1, wherein the plurality of framers comprises Optical Transport Network (OTN) framers.

5. The optical transceiver of claim 1, wherein N comprises 10 and M comprises about 10 Gb/s.

6. The optical transceiver of claim 1, wherein N comprises 4 and M comprises about 25 Gb/s.

7. The optical transceiver of claim 1, wherein the optical transceiver comprises one of a CFP and variants thereof, compliant to OIF-MSA-100GLH-EM-01.0—Multisource Agreement for 100G Long-Haul DWDM Transmission Module—Electromechanical (June 2010), CCRx, Quad Small Form-factor Pluggable (QSFP) and variants thereof (e.g., future QSFP+, QSFP2), and 10×10 MSA.

8. A CFP pluggable optical transceiver comprising:
   interface circuitry configured to communicate with a host system;
   a plurality of framers connected to the interface circuitry and each configured to frame one of N signals each at a rate M, N being an integer;
   management circuitry communicatively coupled to each of the plurality of framers and the host system, wherein the management circuitry is configured to aggregate data from each of the framed N signals for management of the N signals as a single virtualized framed signal,
   wherein the management circuitry is configured to aggregate data by summing performance monitoring data in overhead from each of the framed N signals and performing a logical OR function on alarm data in the overhead from each of the framed N signals.

9. The CFP pluggable optical transceiver of claim 8, further comprising:
   optical components configured to optically interface each of the framed N signals, wherein each of the framed signals is separately framed and optically interfaced and the management circuitry is configured to collectively manage the framed N signals as the single virtualized framed signal.

10. The CFP pluggable optical transceiver of claim 8, wherein the management circuitry comprises a management interface communicatively coupled to a host system operating the optical transceiver, wherein the management interface interfaces operations, administration, maintenance, and provisioning (OAM&P) data with the host system for the single virtualized framed signal.

11. The CFP pluggable optical transceiver of claim 8, wherein the plurality of framers comprises Optical Transport Network (OTN) framers.

12. The CFP pluggable optical transceiver of claim 8, wherein N comprises 10 and M comprises about 10 Gb/s.

13. The CFP pluggable optical transceiver of claim 8, wherein N comprises 4 and M comprises about 25 Gb/s.

14. An N×M pluggable optical transceiver comprising:
   interface circuitry configured to communicate with a host system;
   a plurality of framers connected to the interface circuitry and each configured to frame one of N signals each at a rate M, N being an integer;
   management circuitry communicatively coupled to each of the plurality of framers and the host system, wherein the management circuitry is configured to aggregate data from each of the framed N signals for management of the N signals as a single virtualized framed signal; and
   optical components configured to optically interface each of the framed N signals, wherein each of the framed signals is separately framed and optically interfaced and the management circuitry is configured to collectively manage the framed N signals as the single virtualized framed signal,
   wherein the management circuitry is configured to aggregate data by summing performance monitoring data in overhead from each of the framed N signals and performing a logical OR function on alarm data in the overhead from each of the framed N signals.

15. The N×M pluggable optical transceiver of claim 14, wherein the management circuitry comprises a management interface communicatively coupled to a host system operating the optical transceiver, wherein the management interface interfaces operations, administration, maintenance, and provisioning (OAM&P) data with the host system for the single virtualized framed signal.

16. The N×M pluggable optical transceiver of claim 14, wherein the plurality of framers comprises Optical Transport Network (OTN) framers.

17. The N×M pluggable optical transceiver of claim 14, wherein N comprises 10 and M comprises about 10 Gb/s.

18. The N×M pluggable optical transceiver of claim 14, wherein N comprises 4 and M comprises about 25 Gb/s.

* * * * *